United States Patent [19]

Kaunitz

[11] Patent Number: 4,594,873
[45] Date of Patent: Jun. 17, 1986

[54] METHOD AND APPARATUS FOR PREPARING PIPE SECTIONS FOR WELDING

[76] Inventor: Clyde F. Kaunitz, 2339 Bay Woods Ct., Bay City, Mich. 48706

[21] Appl. No.: 666,177

[22] Filed: Oct. 29, 1984

[51] Int. Cl.[4] .......................... B21D 41/02; B21D 19/00
[52] U.S. Cl. ........................................... 72/340; 72/294; 72/370; 72/393; 228/173.4; 228/15.1; 82/44; 82/4 C
[58] Field of Search ................ 72/340, 393, 399, 370, 72/294, 71, 70; 228/49.3, 172, 173.4, 173.2, 15.1; 279/2 R; 82/44, 4 C, 2 E; 51/290

[56] References Cited

U.S. PATENT DOCUMENTS

| | | | |
|---|---|---|---|
| 972,122 | 10/1910 | Merrill | 72/71 |
| 1,383,840 | 7/1921 | Mueller et al. | 72/71 |
| 1,876,914 | 9/1932 | Gordon | 72/294 |
| 3,583,200 | 6/1971 | Cvijanovic | 72/393 |
| 3,613,320 | 10/1971 | Mighton | 51/290 |
| 3,648,500 | 3/1972 | Vaill | 72/370 |
| 3,951,018 | 4/1976 | Gilmore | 82/4 C |
| 4,201,394 | 5/1980 | Morawski | 82/44 |
| 4,212,186 | 7/1980 | Blatter | 72/393 |
| 4,437,366 | 3/1984 | Astle | 82/4 C |
| 4,493,232 | 1/1985 | Nall | 279/2 R |

Primary Examiner—Daniel C. Crane
Attorney, Agent, or Firm—Basile, Weintraub & Hanlon

[57] ABSTRACT

A method and apparatus is disclosed for preparing the ends of large diameter metal pipe, such as that employed in cross-country pipelines, for welding of two pipe sections in end-to-end relationship with each other. Apparatus is provided for performing the method under which the pipe end to be prepared is first radially expanded uniformly around the entire circumference beyond its elastic limit to a predetermined diameter. While the expanding device holds the pipe end in this expanded position, a lathe aligned and associated with the expanding device is actuated to a machine beveled surface on the pipe end. Upon release and removal of the expansion mechanism, the pipe end remains in a permanently deformed truly circular configuration of a precisely predetermined diameter with the general plane of the pipe end accurately located in true perpendicularly to the pipe axis, thus enabling ends of a pair of adjacent pipe sections to be precisely aligned with each other around the entire pipe circumference in preparation for the welding of the two sections to each other.

2 Claims, 3 Drawing Figures

METHOD AND APPARATUS FOR PREPARING PIPE SECTIONS FOR WELDING

BACKGROUND OF THE INVENTION

The present invention is directed to improved methods and apparatus for preparing the ends of large diameter metal pipe employed in cross-country pipelines for welding.

Pipe employed in cross-country pipelines, such as the Alaska pipeline, is made up of individual pipe sections which are welded to each other end-to-end at the site of installation. The individual pipe sections are constructed of metal and are relatively large-sized; the typical dimensions of an individual pipe section being a length of 40 feet, a diameter of 30, 40 or more inches, and a wall thickness of one-half of an inch to three-quarters of an inch. Because pipelines of the type here under consideration frequently extend for hundreds of miles and pass through remote sections of country, the individual pipe sections must be transported from their place of manufacture over long distances to their point of installation and frequently must be stored or stockpiled at locations in the field. In the course of this transporting, handling and storage, the pipe sections are subjected to rough handling, prolonged exposure to weather and other adverse conditions.

The achievement of a good weld between abutting ends of pipe sections requires that the end of the pipe be clean, free of rust, nicks and dents, and that the end edge be accurately beveled to receive the weldment. It is thus known in the art to utilize tooling operable in the field to machine the pipe ends just prior to welding so that the weldment is applied to a clean, freshly machined surface.

However, presently employed pipe end machining techniques typically do not take into account any out-of-roundness of the pipe end, slight variations in diameter which may exist between individual pipe sections and slight variances of the plane of the pipe end from true perpendicularity to the pipe axis. These last two problems normally arise from the manufacturing process where precise dimensioning of the final product must be traded off against production cost. Out-of-roundness is more likely to be generated in the handling of the pipe after it has been manufactured and can result from the commonly employed practice of storing the pipe sections in multi-layer stacks. Where the pipe is of a diameter of 40 inches, a slight degree of out-of-roundness, for example, may produce a degree of mis-alignment over at least a portion of the circumference of two abutted pipe sections sufficient to prevent the formation of a satisfactory welded joint between the two sections.

The present invention is especially directed to a method and apparatus by means of which pipe section ends may be prepared for welding in a manner which forms a pipe end truly circular to a precisely determined diameter so that adjacent ends of adjacent pipe sections may be precisely and truly aligned with each other throughout their entire circumference for the welding operation.

SUMMARY OF THE INVENTION

In accordance with the present invention, a pipe end expanding mechanism includes a housing symmetrical about a central axis. The housing is dimensioned to be inserted within the end of the pipe section and includes a squaring and locating device engageable with the interior of the pipe wall which will locate the axis of the housing coaxial with the longitudinal axis of the pipe. A plurality of heavy rod-like members are mounted in the housing at symmetrically disposed positions for sliding movement in and out radially of the housing axis. The rods project from the housing and each rod carries at its outer end a pipe wall engaging shoe which circumferentially overlaps the shoes on adjacent rods so that the shoes cooperatively define at their radially outer surfaces a substantially continuous cylindrical surface. The inner end of each of the rods is fixedly mounted upon a movable expansion block whose radially inner surface is inclined with respect to the housing axis.

A heavy draw bar is slidably mounted in the housing for reciprocatory movement coaxially of the housing, and carries on its outer surface a group of symmetrically disposed wedge-shaped blocks which are fixed to the draw bar and slidably engage the inclined inner surfaces of the expansion blocks. When the draw bar is pulled in one direction, the wedge-shaped blocks on the draw bar slide on the engaged surfaces of the respective expansion blocks to drive, by a wedging action, the rods and expansion shoes radially outward against the end section of the pipe in which the housing is located. The draw bar extends from the expansion member housing outwardly of the pipe end centrally through a lathe face plate and through a housing section for the lathe driving and feeding mechanism. Relatively large hydraulic cylinders mounted on the housing are employed to drive the draw bar in its axial pipe expanding movement.

The expanding forces which the expansion mechanism is capable of producing are sufficient to enable the expansion mechanism to radially expand the end of the pipe slightly beyond its elastic limit. A positive stop engageable with the wedge-blocks on the draw bar dimensionally limits this expanding action to a diameter which is predetermined, and at which the curved surfaces of the shoe define a truly cylindrical surface of a predetermined diameter.

While the pipe end is held in this expanded condition by the expansion mechanism, the lathe is actuated to machine the pipe end to the desired bevel. Because the expansion member and lathe housing are located by the squaring and centering device to be in coaxial relationship with the pipe axis, the pipe is machined with the machined surface of its end truly coaxial to the pipe axis on a true circular surface and to a beveled edge which lies in a general plane truly perpendicular to the pipe axis. Because the pipe is expanded beyond its elastic limit by the expansion mechanism, the end of the pipe remains substantially (with a slight retraction) in its expanded condition after the expansion mechanism has been retracted and withdrawn from the pipe, and all pipe ends prepared by the device may be accurately matched with each other for welding.

Other objects and features of the invention will become apparent by reference to the following specification and to the drawings.

DESCRIPTION OF THE PREFERRED EMBODIMENT

Figure 1:
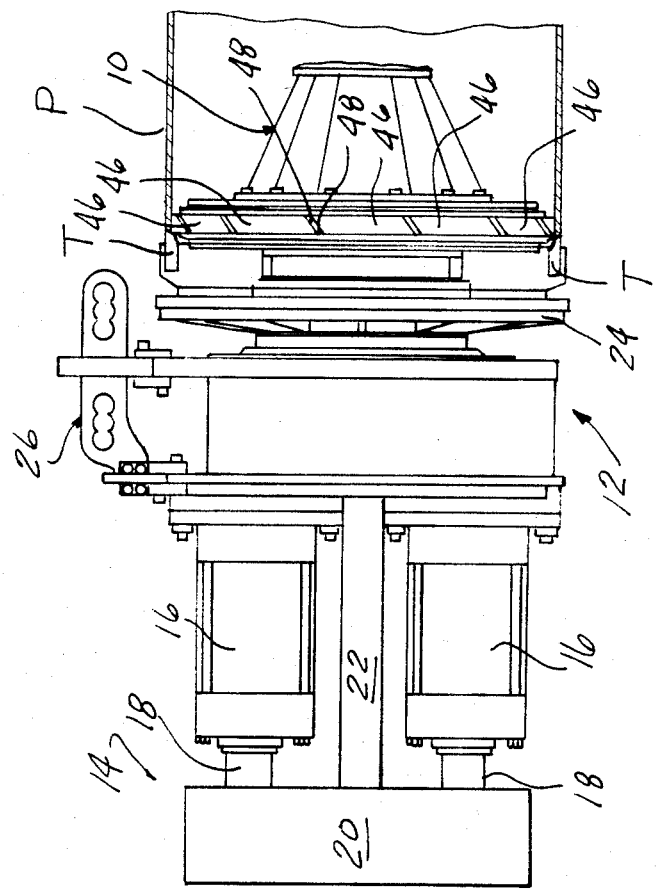
FIG. 1 is a side elevational view, partially in section, showing an apparatus embodying the present invention in operative relationship with a pipe whose end is being prepared for welding.

Referring first to FIG. 1, an apparatus embodying the present invention includes an expansion mechanism designated generally 10, a main housing designated generally 12 and an expansion mechanism actuating assembly designed generally 14 which includes a pair of hydraulic cylinders 16 mounted on the side of housing 12 remote from expansion mechanism 10. The piston rods 18 of the hydraulic cylinders 16 are commonly fixedly connected to a heavy thrust block 20 which is in turn fixedly attached to the end of a draw bar 22 which extends axially from the block 20 coaxially through housing 12, a lathe face plate 24 and into and through the housing of expansion mechanism 10 in a manner to be described below.

The lathe face plate 24 is mounted for rotation relative to draw bar 22 and housing 12 and is also supported from housing 12 for axial movement.

The internal structure of the lathe is conventional and includes suitable drive means, not shown, for driving face plate 24 in rotation and suitable axial feed means for moving face plate 24 axially relative to housing 12 so that cutting tools T carried on the lathe face plate can be advanced against the end edge of a pipe P to machine the end surface of the pipe to a desired bevel determined by the shape of the cutting portion of the tool T.

As stated above, the pipe ends are machined in the field at a location close to the point at which the pipe sections are installed in the pipe line. In the performance of this machining operation, the pipe section P is typically supported upon a cradle while the pipe end preparation apparatus which performs the machining operation is typically supported from a crane assembly mounted upon an off-the-road vehicle. In FIG. 1, the pipe supporting cradle is not shown because the cradles may take any of many forms known to those skilled in the art. A suspension assembly designated generally 26 is shown in FIG. 1 for coupling the lathe-expansion mechanism to such a crane.

As implied from the foregoing, the machining of a pipe end in the field by a lathe of the general type here illustrated in known in the prior art, this operation being performed to prepare the end surface of the pipe with a clean, freshly machined beveled surface for subsequent welding to a similarly prepared surface of another pipe section. The present invention is especially concerned with the problem of assuring that the end edge of the pipe section is prepared in a manner such that the finished end edge is (1) truly circular, (2) of a precise predetermined diameter and (3) with the general plane of the end edge being flat and truly perpendicular to the pipe section axis. As noted above, because of the rough handling and other conditions encountered by the pipe sections and dimensional variations between individual pipe sections arising because of the pipe manufacturing process, out-of-roundness, and dimensional variations of a magnitude sufficient to make it impossible to align ends of adjacent pipe sections with each other to a degree of precision required by the welding operation are frequently encountered problems.

In accordance with the present invention, a pipe end expansion mechanism, such as the expansion mechanism 10 to be described below, is employed to radially expand the pipe end beyond the elastic limit of the pipe metal to an accurately predetermined diameter which is uniform around the entire circumference of the expanded pipe. For a 40 inch nominal diameter pipe an expansion of the diameter of about 0.075 inches will suffice. While the pipe is held in this expanded condition, the lathe or machining mechanism is actuated to machine the end edge of the pipe to the desired beveled cross-section. After the machining operation, the expanding mechanism is retracted and withdrawn from the pipe end.

Because the expansion of the pipe end circumferentially and radially expands the pipe end beyond the elastic limit of the pipe metal, the end edge portion of the pipe is permanently "deformed" from its pre-expanded state and is thus formed to a predetermined diameter which is slightly less than the diameter to which it was expanded and retains the circular configuration built into the expanding mechanism. The final diameter is less than the fully expanded diameter by approximately 0.001 inch-per-inch of original diameter. Squaring of the pipe end is performed by a squaring and centering mechanism, not shown, but partially indicated at 28 in FIG. 2, which typically takes the form of symmetrically disposed wheels on a frame coupled to the housing of the end preparation mechanism. The wheels radially engage the inner wall of the pipe and align the end preparation device accurately with the pipe axis. Many examples of squaring and centering devices of this type may be found in the prior art.

Figure 3:
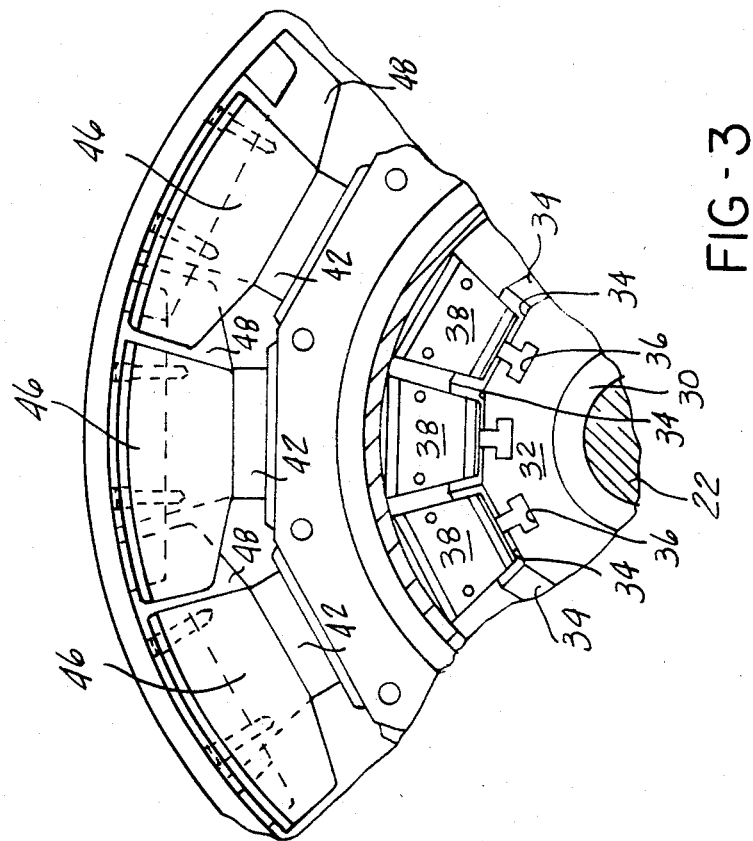
FIG. 3 is a partial cross-sectional view taken on the line 2—2 of FIG. 2.
Figure 2:
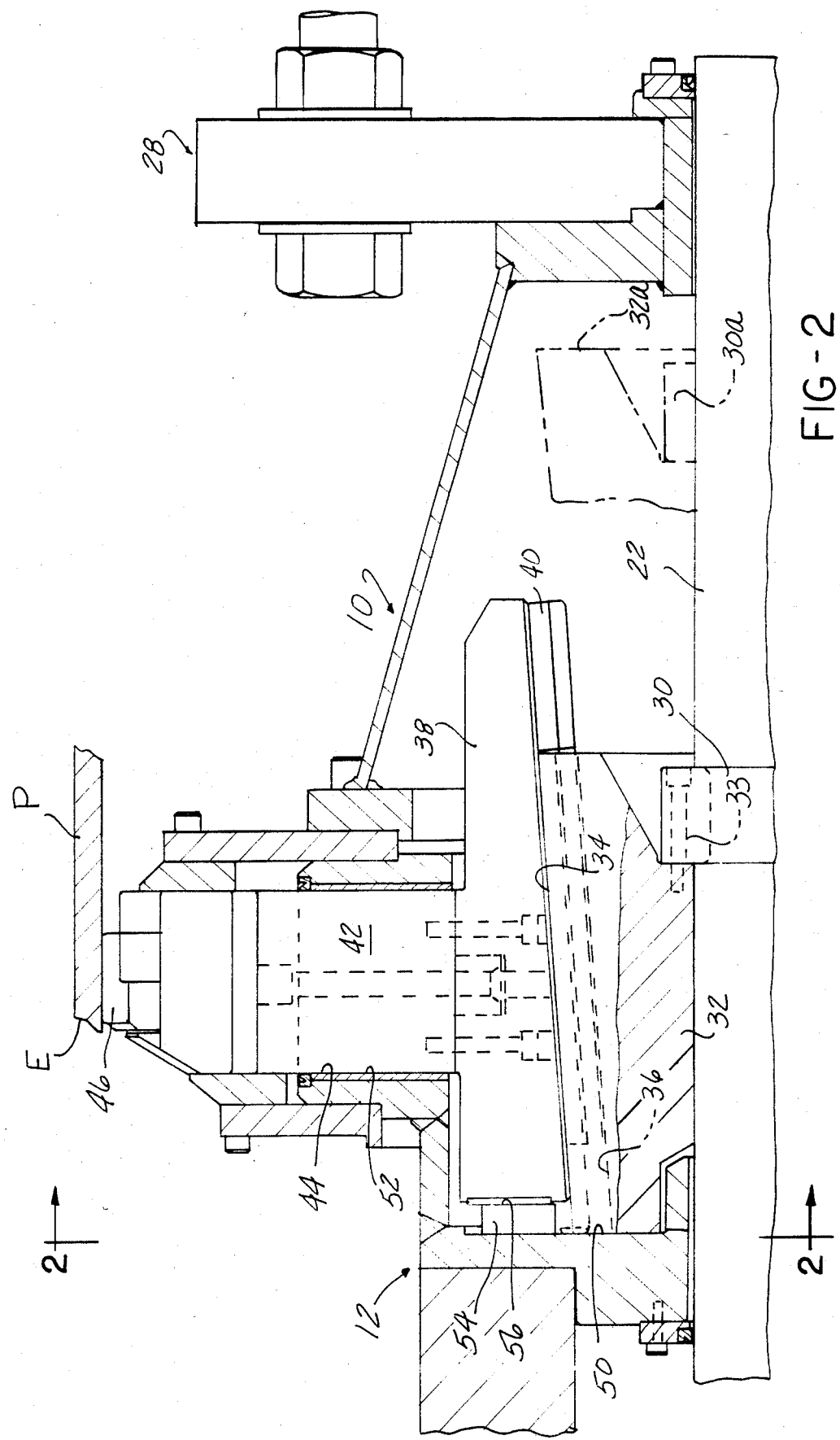
FIG. 2 is a detailed cross-sectional view of a portion of the expansion mechanism.

Referring now, particularly to FIGS. 2 and 3, an expansion mechanism for performing the method described above is shown. The operating elements which participate directly in the expanding operation are all symmetrically disposed about the axis of shaft 22, and hence only a portion of the mechanism has been shown. Referring first to FIG. 2, it is seen that shaft 22 carries a heavy shaft collar assembly 30 which is fixedly mounted and seated in a groove 33 formed in the shaft. A one-piece expansion block 32 surrounds the shaft 30 and is coupled to and axially engaged by the shaft collar 30 as by a plurality of bolts 33. The radial outer surface of expansion block 32 is in the form of a frustum of a pyramid of regular polygonal transverse cross-section, the particular embodiment shown here in the drawings being a twelve-sided pyramid, the respective sides being designated by reference numeral 34 in FIG. 3. In cross-section, as best seen in FIG. 2, each of the flat outer side surfaces of expansion member 32 provides a wedge-like surface inclined to the axis of draw bar 22. T slots 36 are cut into each side surface 34 to extend parallel to surface 34 centrally of the surface.

Each side surface 34 slidably supports a wedge-shaped block 38 whose radial inner surface is inclined at an angle complementary to that of the inclination of the surfaces 34. The radial inner surface of the blocks 38 each carry a T-shaped slide member slidably received within the T slot of the associated side of expansion block 32.

Fixedly mounted upon and projecting upwardly from each block 38 is a relatively thick heavy rod 42 which is slidably received within a radially extending passage formed in the housing 10 of the expansion assembly. An expansion shoe 46 is fixedly mounted upon the radial outer end of each rod 42 to project from housing 10. As best seen in FIG. 3, the radial outer surfaces of shoes 46 are convexly curved to cooperatively define a cylindrical surface of a predetermined diameter. The individual shoes 46 circumferentially overlap each other with their opposite end edges being inclined in the manner best seen in FIG. 1.

In FIG. 2, draw bar 22 is shown at its extreme left-hand limit of movement as viewed in FIG. 2, this extreme left-hand limit of movement of draw bar 22 corresponding to the maximum expanded position of the expansion mechanism. Operation of the hydraulic cylinders 16 is capable of axially shifting draw bar 22 to move expansion block 32 axially of housing 12 between the full-line position shown in FIG. 2 and the broken-line position partially indicated at 32a, 30a in FIG. 2. It is believed apparent that movement of the draw bar to shift expansion block 32 between the two indicated end limits of movement will cause the assembly, which includes block 38, rod 42 and shoe 46, to move radially inwardly and outwardly of housing 10, and that this radial inward and outward movement is simultaneously applied to all 12 of the block 38, rod 42 and shoe 46 assemblies.

When draw bar 22 is at its extreme right-hand end limit of movement, and expansion block 32 is at the broken-line position indicated at 32a in FIG. 2, the individual assemblies 38-42-46 are radially withdrawn inwardly of the housing, positive radial inward movement being assured by the engagement between the T-shaped member 40 on the blocks 38 and the T slots in block 32. When the assemblies 38-42-46 are so radially retracted, the expansion mechanism can be inserted within the pipe end as in FIG. 1. Hydraulic cylinders 16 are then actuated to drive draw bar 22 to the left from its broken-line position in FIG. 2 toward the full line position shown in that figure, this movement of the expansion block radially driving the assemblies 38, 42 and 46 outwardly to first move the shoes 46 into contact with the inner wall of the pipe adjacent its end E and to subsequently, upon further movement, to radially expand the pipe end symmetrically around its entire circumference.

As stated above, it is necessary to expand the pipe beyond the elastic limits of the pipe metal to achieve a permanent deformation of the pipe end, and substantial forces are required to accomplish this expansion. For a pipe of 40-inch diameter and ⅜-inch wall thickness, two hydraulic cylinders 16 of 10-inch effective operating diameter in combination with a 3,000 psi pressure source and a wedge angle (angle of surface 34 of expansion block 32 to the axis of draw bar 22) of 10° or less will provide an adequate expansion force. Even in the case where a relatively large diameter draw bar 22 is employed, the forces developed may slightly stretch draw bar 22, thus a positive stop limiting movement of the expansion block axially is provided by the housing wall as at 50.

Axial movement of the assemblies 38-42-46 is prohibited because the rod section 42 is mounted for only radial movement within the housing. Desirably, the wall of passage 44 is formed with a low friction surface at 52 and a pad 54 mounted on the housing engages a low friction surface 56 on each block 38 to restrain the block 38 against the axial component of the wedging action while accommodating radial movement. The inter-engaging surfaces between blocks 38 and the wedging surfaces 34 of expansion block 32 are likewise preferably provided with low friction material to minimize friction between these two surfaces which, during expansion, are pressed together by extremely large forces.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

I claim:

1. Apparatus for the on-site preparation of an end of a large diameter metal pipe section of the type employed in cross-country pipe lines for welding end-to-end to a like pipe section comprising:

a frame adapted to be axially inserted into an end of said pipe section with the main axis of said frame coaxial with the axis of said pipe section, a plurality of pipe expanding shoes mounted in said frame for movement radially of said main axis, said shoes projecting outwardly from said frame at locations symmetrically disposed about said main axis and having radially outwardly facing pipe wall engaging surfaces with the adjacent ends of adjacent shoes circumferentially overlapping each other to cooperatively collectively define a substantially continuous cylindrical surface of relatively short axial length and of a predetermined diameter greater than the original nominal inside diameter of said pipe section when said shoes are at a maximum end limit of radial displacement from said main axis, power drivven expanding means including a drawbar mounted on said frame for reciprocatory movement along said main axis between a first and a second end limit of movement, power means for driving said drawbar in movement between said end limits, a frusto-pyramidal expansion member fixedly and coaxially mounted on said drawbar and having a plurality of like side surfaces uniformly inclined to said main axis, a plurality of wedge-shaped shoe blocks respectively slidably supported on said side surfaces and mounted for radial movement in said frame, said shoes being respectively fixedly mounted on said shoe blocks, said expanding means being operable when at said one end limit to locate all of said shoes in a retracted position accommodating axial insertion of said shoes into one end of said pipe section and being operable upon movement toward said second end limit to simultaneously drive all of said shoes radially outwardly of said frame into contact with the inner surface of said pipe and upon power driven movement of said expanding means to said second end limit to radially expand the end of said pipe beyond the elastic limit of the metal of said pipe to a predetermined inside diameter larger than said original nominal inside diameter, and means mounted on said frame for rotation about said main axis for machining the end surface of said pipe to a predetermined configuration while said end of said pipe is held at said predetermined inside diameter by said expanding means.

2. The method for the on-site preparation of an end of a large diameter steel pipe section of the type employed in cross-country pipe lines, having a wall thickness of ½ inch or more, for welding end to end to a similar pipe section comprising the steps of:

a. fixedly positioning a pipe section to be prepared with its axis in a horizontal position, b. axially inserting into one end of the positioned pipe section a contracted radially expansible expansion mechanism operable when radially expanded to radially expand the pipe end simultaneously around its entire circumference beyond the elastic limit of the pipe metal to a predetermined uniform diameter in excess of the original nominal diameter of the pipe, c. permanently deforming said pipe by radially expanding said mechanism after it has been inserted into said one end of said pipe to form a truly cylindrical end section of said predetermined diameter at said one end of said pipe and to temporarily fixedly hold the said end section of the pipe end expanded to said predetermined diameter, and d. machining the said one end of said pipe to a desired welding bevel configuration while the pipe is held expanded to said predetermined diameter by said mechanism.

* * * * *